United States Patent [19] [11] 3,968,418
Kain et al. [45] July 6, 1976

[54] CONVERTOR CONNECTION WITH ASYMMETRY INDICATING MEANS

[75] Inventors: Per Kain; Kjeld Thorborg, both of Vasteras, Sweden

[73] Assignee: Allmanna Svenska Elektriska Aktiebolaget, Vasteras, Sweden

[22] Filed: Dec. 12, 1974

[21] Appl. No.: 532,210

[30] Foreign Application Priority Data
Jan. 7, 1974 Sweden .............................. 7400131

[52] U.S. Cl. .............................. 321/12; 317/36 TD; 317/49
[51] Int. Cl.² .......................................... H02H 7/10
[58] Field of Search ............ 317/36 TD, 43, 47, 48, 317/49; 321/11, 12, 13

[56] References Cited
UNITED STATES PATENTS

| | | | |
|---|---|---|---|
| 3,327,170 | 6/1967 | Sonnemann ....................... | 317/47 X |
| 3,764,885 | 10/1973 | Buxbaum et al. .................... | 321/13 |
| 3,805,141 | 4/1974 | Pompa et al. ....................... | 321/11 |
| 3,876,922 | 4/1975 | Forstbauer .......................... | 321/11 |

Primary Examiner—A. D. Pellinen

[57] ABSTRACT

A convertor connection for connection to a DC circuit includes current sensing members for forming a quantity corresponding to the direct current of the convertor connection. An indicating arrangement is provided for indicating asymmetrical operating conditions, which includes a first band pass filter connecting to the current sensing members which let through frequencies in a frequency band located between zero and the fundamental frequency of the AC component during undisturbed operation. When the output signal of the first filter exceeds a predetermined value, through a second filter an asymmetry indicating signal is emitted. The release of an output signal is prevented by a delay arrangement if the duration of the asymmetrical operating condition is less than a predetermined time.

3 Claims, 7 Drawing Figures

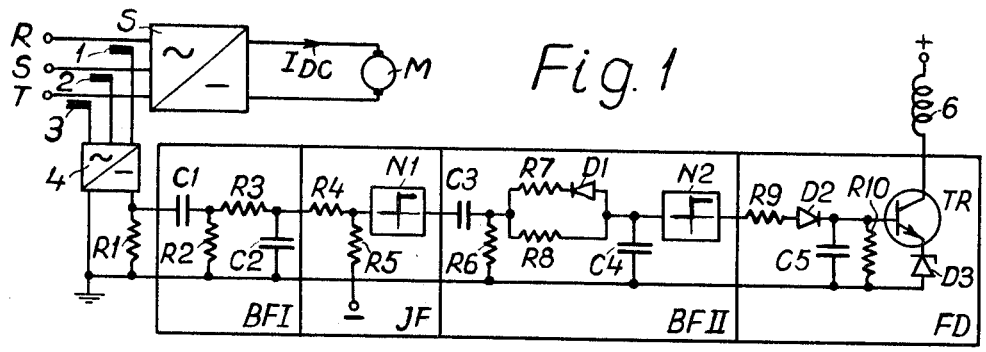
Fig. 1
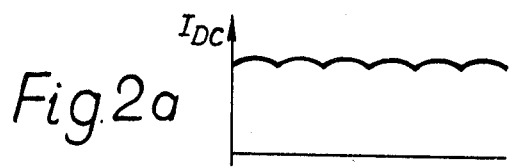
Fig. 2a
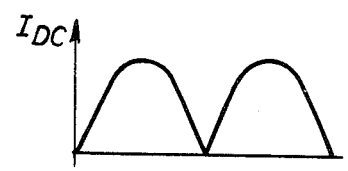
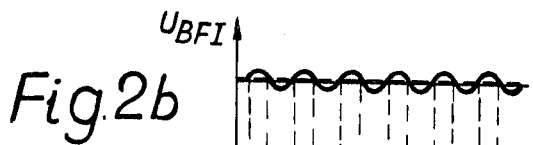
Fig. 2b
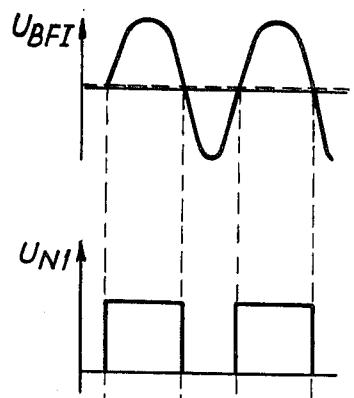
Fig. 2c
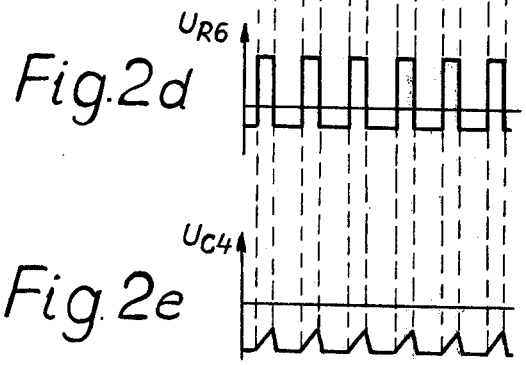
Fig. 2d
Fig. 2e
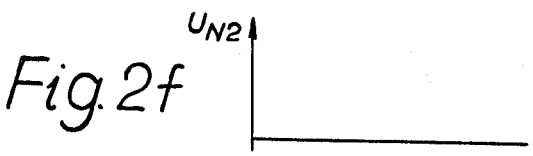
Fig. 2f
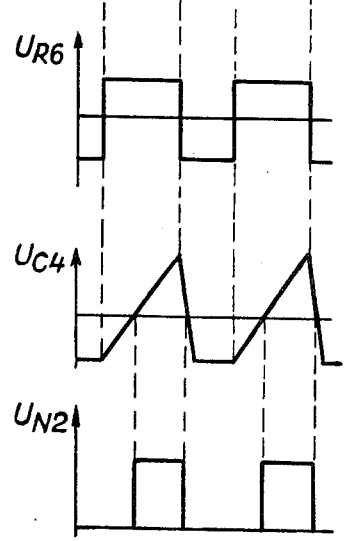

CONVERTOR CONNECTION WITH ASYMMETRY INDICATING MEANS

BACKGROUND OF THE INVENTION

1. Field of the Invention

The present invention relates to a convertor connection having asymmetry indicating means for indicating an abnormal, asymmetrical condition in a convertor connection.

2. The Prior Art

One example of a convertor connection where such conditions may appear is a controlled three-phase convertor bridge feeding a DC motor. In this case it has been found that several types of errors, for example valve interruption, drop-out of a phase voltage of malfunction of the control pulse device of the bridge, which in themselves do not make further operation impossible, may cause severe damage to the motor connected to the convertor by rendering the commutation difficult. Also in other types of converters and load objects it is desirable to obtain, in a simple manner, a quick and safe indication of faults of the above-mentioned types.

SUMMARY OF THE INVENTION

The invention aims to provide a solution to these problems, and what characterizes a convertor connection according to the invention is that current sensing members form a quantity corresponding to the direct current of the convertor connection, and that an indicating means for indicating asymmetrical operating conditions is connected to the current sensing members. This indicating means includes a first band pass filter means which lets through frequencies within a frequency band located between zero and the fundamental frequency of the AC component during undisturbed operation. Means are provided for emitting an asymmetry indicating signal when the output signal of the first filter means exceeds a predetermined amplitude value. A delay means is arranged to prevent the release of an output signal if the duration of the asymmetrical operating condition is less than a predetermined value. The means for emitting the asymmetry indicating signal includes comparing means which compare the output signal from the first band pass filter with a reference value corresponding to such predetermined amplitude value, and a second band pass filter, to which the comparing means emits a signal in response to an output signal value greater than the reference value.

BRIEF DESCRIPTION OF THE DRAWINGS

In the following the invention will be further described with reference to the accompanying FIGS. 1 and 2. FIG. 1 shows an embodiment of a convertor connection according to the invention, and FIGS. 2a to 2f show some of the quantities occurring in the device as functions of time.

DESCRIPTION OF THE PREFERRED EMBODIMENTS

FIG. 1 shows a convertor S the AC side of which is connected to a feeding three-phase AC voltage network RST. A DC motor M is connected to the DC side of the convertor. The convertor may be a controllable three-phase thyristor bridge.

A current measuring device known per se consists of three current transformers 1, 2 and 3 connected in the AC leads of the bridge. The secondary currents of said transformers are supplied to a three-phase diode rectifier bridge 4, to the DC terminal of which a resistor R1 is connected. The voltage acros R1 is at every moment proportional to the direct current $I_{DC}$ of the convertor S. This voltage is supplied to the proper asymmetry indicating means.

The voltage is first filtered in a first band pass filter BFI. This is constructed so as to block for the frequency zero (the DC voltage component) and to attenuate the fundamental frequency of the AC component of the direct current during undisturbed operation. In a three-phase bridge and at 50 Hz AC voltage the last-mentioned frequency will be 300 Hz (frequency of AC voltage multiplied by the pulse number of the convertor). However, the band pass filter lets through frequencies in a band between these two values, in the above case mainly between about 30 Hz and about 150 Hz. The output signal from the band pass filter BFI is supplied to a comparison circuit JF and is there compared with a reference value. If the output signal exceeds the reference value, an output signal is delivered to a second band pass filter BFII, where an additional band pass filtering is performed. The output signal from this band pass filter is supplied to a delay circuit FD which prevents short-term asymmetries, for example caused by transient phenomena, from giving rise to an output signal from the asymmetry indicating means. The output signal from the delay circuit has the form of a current through the relay coil 6. The relay may be used for delivering a signal to an operator or for releasing a breaker which cuts the convertor out of the network.

The band pass filter BFI has nearest the entrance a high-pass portion (capacitor C1 and resistor R2) and thereafter a low-pass portion (resistor R3 and capacitor C2) which together perform a first band pass filtering.

FIGS. 2a to 2f show certain quantities as functions of the time, to the left in undisturbed, symmetrical operation, and to the right in the case of asymmetrical operation which is obtained in the event of drop-out of one of the phase voltages of the feeding three-phase network (the load has been assumed to be resistive). FIG. 2a shows the direct current $I_{DC}$. In the normal case an AC component with the fundamental frequency 300 Hz is superposed on the DC component. This component is strongly, but not entirely, reduced in the filter BFI, the output voltage $U_F$ of which may have the appearance shown at the left-hand part of FIG. 2b. In the asymmetrical case, in the right-hand part there is a strong 100 Hz component in the direct current, which passes through the filter with a low attenuation.

The comparison circuit JF consists of a level flip-flop N1, whose output signal is zero if the input signal is less than zero and "one" if the input signal is greater than zero. The input of the level flip-flop is supplied on the one hand with the signal from BFI by way of resistor R4, and on the other hand with a reference signal which is obtained from a negative DC voltage source by way of resistor R5. When the output signal from BFI is positive and greater than the reference signal, the input signal to N1 becomes positive and the output signal from N1 becomes "one". The reference level is shown in FIG. 2b as a broken line. The reference level is so chosen that normal asymmetries, for example unavoidable asymmetries in the feeding mains voltage or in the control pulse device of a controlled convertor, do not cause any output signal to be emitted from the asymmetry indicting means. FIG. 2c shows the output signal from N1 in the two current cases.

The band pass filtering obtained in BFI is not sufficient. The output signal from N1 is therefore further filtered in the second band pass filter stage BFII. This comprises first a high pass portion, consisting of the capacitor C3 and the resistor R6, where low-frequency components are further suppressed. The voltage across the resistor R6($U_{R6}$) is shown in FIG. 2d. For suppressing high-frequency components there is also a circuit, consisting of the resistors R7 and R8, the diode D1, the capacitor C4 and the level flip-flop N2. During the positive interval of $U_{R6}$, C4 is charged by means of R8 (diode D1 blocking). The time constant for this charging is so chosen that the voltage across the capacitor C4 is never able to reach zero during one of the high-frequency pulses that one wishes to eliminate (for example, the normal 300 Hz component). During the negative interval of $U_{R6}$, C4 is discharged by means of R7 and R8 (D1 conducting), and the resistance of R7 is chosen so that a quick discharge is obtained.

The appearance of the voltage across the capacitor C4 is shown in FIG. 2e. As will be seen at the left-hand part the voltage never reaches zero in the case of undisturbed operation. The level flip-flop N2 will therefore have an output signal which is constantly equal to zero, that is, the high-frequency components appearing in the undisturbed operation are completey filtered out. In the case of asymmetrical operation to the right, the frequency is lower and the pulse width of the pulses from N1 is therefore greater, and the voltage across C4 is therefore able to become positive during each pulse. The level flip-flop N2, which has the same function as N1, switches over to the output signal "one" as soon as the input signal exceeds zero. The output signal from N2 ($U_{N2}$) consists of a pulse train, as shown in the right-hand part of FIG. 2f.

This pulse train is supplied to the delay circuit FD. This contains the capacitor C5, which is charged by the pulse train from N2 by way of the resistor 9 and the diode D2, and which is discharged through the resistor R10. The voltage across the capacitor C5 is supplied to the base electrode of the transistor TR. The emitter electrode of said transistor is connected to earth through the Zener-diode D3. Its collector electrode is connected to a positive DC voltage source through the relay coil 6. When the voltage of the capacitor C5 is less than the Zener-voltage of the diode D3, no current flows through the transistor. As soon as the capacitor voltage exceeds the Zener-voltage, the transistor becomes conducting and the relay coil 6 receives current. The time constant R9-C5 is so chosen that it takes a certain amount of time, for example one or a few tenths of a second, for a pulse train from N2 to charge C5 to the Zener-voltage. In this way asymmetries which are caused by normal transient phenomena will not cause the release of an output signal from the asymmetry indicating means. The resistance of R10 is so chosen that a discharge of C5 with a suitable time constant, for example a second or two, is obtained, the capacitor voltage thus being restored between any transient phenomena.

The asymmetry indicating means described is only one example, and the indicating means and its parts may be constructed in a great many other ways within the scope of the invention. The convertor may be uncontrolled or controlled and may have a phase number other than three, and it may consist of various combinations of convertor bridges. In all cases a convertor connection according to the invention provides a quick and safe indication of the majority of the most frequent types of faults which will occur in a convertor.

In the example decribed above, the band pass filter has two stages, one before and one after the comparison member. Each of these stages can be constructed in a number of other ways, well-known per se. Similarly, the second stage may be left out if the first stage is constructed with sufficiently sharp band limits.

We claim:

1. Convertor connection for connection to a DC circuit and comprising current-sensing members (1, 2, 3, 4, R1) for forming a quantity corresponding to the direct current ($I_{DC}$) of the convertor connection, the convertor connection comprising an indicating means (BFI, JF, BFII, FD) for indicating asymmetrical operating conditions, said indicating means comprising a first band pass filter means (BFI) connected to said current-sensing members and including means to let through frequencies within a broad frequency band located between a frequency greater than the frequency zero and the fundamental frequency of the AC component present in the direct current during undisturbed operation, but excluding these frequencies, means (JF, BFII, FD) for emitting an asymmetry indicating signal when the output signal of the first filter means exceeds a predetermined amplitude value, and means to supply the output signal of the first filter means to the signal emitting means.

2. Convertor connection for connection to a DC circuit and comprising current-sensing members (1, 2, 3, 4, R1) for forming a quantity corresponding to the direct current ($I_{DC}$) of the convertor connection, the convertor connection comprising an indicating means (BFI, JF, BFII, FD) for indicating asymmetrical operating conditions, said indicating means comprising a first band pass filter means (BFI) connected to said current-sensing members and including means to let through frequencies within a broad frequency band located between a frequency greater than the frequency zero and the fundamental frequency of the AC component present in the direct current during undisturbed operation, but excluding these frequencies, means (JF, BFII, FD) for emitting an asymmetry indicating signal when the output signal of the first filter means exceeds a predetermined amplitude value, means to supply the output signal of the first filter means to the signal emitting means, and delay means (FD) to prevent the release of an output signal if the duration of the asymmetrical operating condition is less than a predetermined value.

3. Convertor connection for connection to a DC circuit and comprising current-sensing members (1, 2, 3, 4, R1) for forming a quantity corresponding to the direct current ($I_{DC}$) of the convertor connection, the convertor connection comprising an indicating means (BFI, JF, BFII, FD) for indicating asymmetrical operating conditions, said indicating means comprising a first band pass filter means (BFI) connected to said current-sensing members and including means to let through frequencies within a broad frequency band located between a frequency greater than the frequency zero and the fundamental frequency of the AC component present in the direct current during undisturbed operation, but excluding these frequencies, means (JF, BFII, FD) for emitting an asymmetry indicating signal when the output signal of the first filter means exceeds a predetermined amplitude value, means to supply the output signal of the first filter means to the signal emitting means, a second band pass filter means (BFII), said means (JF, BFII, FD) for emitting an asymmetry indicating signal comprising comparing means (JF) to compare the output signal from the first band pass filter means with a reference value corresponding to said predetermined amplitude value and responsive to an output signal value greater than the reference value to emit a signal to the second band pass filter means, the output signal of which constitutes the asymmetry indicating signal.

* * * * *